United States Patent
Mathan et al.

(10) Patent No.: US 8,254,634 B2
(45) Date of Patent: Aug. 28, 2012

(54) INTELLIGENT IMAGE SEGMENTATION SYSTEM AND METHOD FOR ACCURATE TARGET DETECTION

(75) Inventors: Santosh Mathan, Seattle, WA (US); Misha Pavel, Portland, OR (US); Deniz Erdogmus, Winchester, MA (US); Kenneth Hild, Portland, OR (US); Rida Hamza, Maple Grove, MN (US); Kwong Wing Au, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 799 days.

(21) Appl. No.: 12/395,217

(22) Filed: Feb. 27, 2009

(65) Prior Publication Data

US 2010/0220904 A1 Sep. 2, 2010

(51) Int. Cl.
*G06K 9/00* (2006.01)

(52) U.S. Cl. ........................................... 382/103

(58) Field of Classification Search .......... 382/128–134; 128/920–925; 356/39–49; 600/407–414, 600/424–426; 345/581–618
See application file for complete search history.

(56) References Cited

U.S. PATENT DOCUMENTS

| 6,028,956 A * | 2/2000 | Shustorovich et al. ....... 382/156 |
| 2008/0056611 A1* | 3/2008 | Mathan et al. ................ 382/284 |

* cited by examiner

*Primary Examiner* — Atiba O Fitzpatrick
(74) *Attorney, Agent, or Firm* — Ingrassia Fisher & Lorenz, P.C.

(57) ABSTRACT

Methods and apparatus are provided for dividing an image into a plurality of image chips for presentation on a display. Potential objects of interest are detected within an image by detecting features therein that correspond to objects of interest. The image is uniformly divided into a plurality of preliminary image chips. Triage image chips are generated by automatically adjusting each preliminary image chip such that the potential objects of interest detected within each preliminary image chip are at least substantially centered in each preliminary image chip.

18 Claims, 4 Drawing Sheets

INTELLIGENT IMAGE SEGMENTATION SYSTEM AND METHOD FOR ACCURATE TARGET DETECTION

STATEMENT REGARDING FEDERALLY SPONSORED RESEARCH OR DEVELOPMENT

This invention was made with Government support under contract NBCHC080030 awarded by the Department of Interior and DARPA. The Government has certain rights in this invention.

TECHNICAL FIELD

The present invention generally relates to target detection systems and methods and more particularly relates to a system and method for intelligently segmenting images prior to presentation to a user.

BACKGROUND

Analysts in various professions may, at times, be called upon to search relatively large collections of imagery to identify, if present, various types of relevant information (referred to herein as "a target entity" or "target entities") in the collection of imagery. For example, medical analysts sometimes diagnose a physical impairment by searching complex imagery collections to identify one or more target entities therein that may be the cause of the physical impairment. Moreover, intelligence analysts may be called upon to search relatively complex imagery collections to identify target entities therein that may relate to various types of intelligence gathering activities.

Advancements in both image collection and storage technology presently allow for the relatively low-cost storage of large volumes of high-quality imagery. However, the cost of searching through large sets of imagery for target entities can often be substantial. Indeed, in many professions, such as intelligence gathering, effective searching may rely on the expertise of highly skilled analysts, who typically search through relatively large sequences of images in a relatively slow manner. Presently, the number of skilled analysts available to search the amount of imagery that is stored, or can potentially be stored, is in many instances insufficient.

In response to the foregoing, there has relatively recently been a focus on developing various systems and methods for triaging imagery. One of the methods that has shown promise combines electroencephalography (EEG) technology and rapid serial visualization presentation (RSVP). Various implementations of this combination have been researched and developed. For example, researchers have experimented with a system in which users are presented, using the RSVP paradigm, a sequence of images, some of which may include particular types of target entities. During the RSVP presentation, EEG data are collected from the users. A classifier then uses the collected EEG data to assign probabilities to each image. The probabilities are representative of the likelihood an image includes a target.

Although useful in sorting a sequence of images, the above described system and method, as well as other systems and methods that employ these same technologies, do suffer certain drawbacks. For example, the likelihood that a user correctly identifies a target in an image can decrease significantly for targets located at or near the periphery of a user's visual field. It is believed that the brief presentation rates provide little opportunity for eye saccades to search the entire span of an image.

Hence, there is a need for a system and method of generating images for presentation to a user in which potential targets are located at least more closely to the center of the displayed images. The present invention addresses at least this need.

BRIEF SUMMARY

In one embodiment, a method of dividing an image into a plurality of image chips for presentation on a display includes detecting potential objects of interest within the image by detecting features therein that correspond to objects of interest. The image is uniformly divided into a plurality of preliminary image chips. Triage image chips are generated by automatically adjusting each preliminary image chip such that the potential objects of interest detected within each preliminary image chip are at least substantially centered in each preliminary image chip.

In another exemplary embodiment, a system for conducting image triage of an image that may include one or more objects of interest includes a display device and a processor. The display device is operable to receive display commands and, in response thereto, to display an image. The processor is coupled to the display device and is configured to selectively retrieve an image, detect potential objects of interest within the image by detecting features therein that correspond to objects of interest, uniformly divide the image into a plurality of preliminary image chips, and generate triage image chips by automatically adjusting each preliminary image chip such that the potential objects of interest detected within each preliminary image chip are at least substantially centered in each preliminary image chip.

Other desirable features and characteristics of the system and method will become apparent from the subsequent detailed description and the appended claims, taken in conjunction with the accompanying drawings and preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
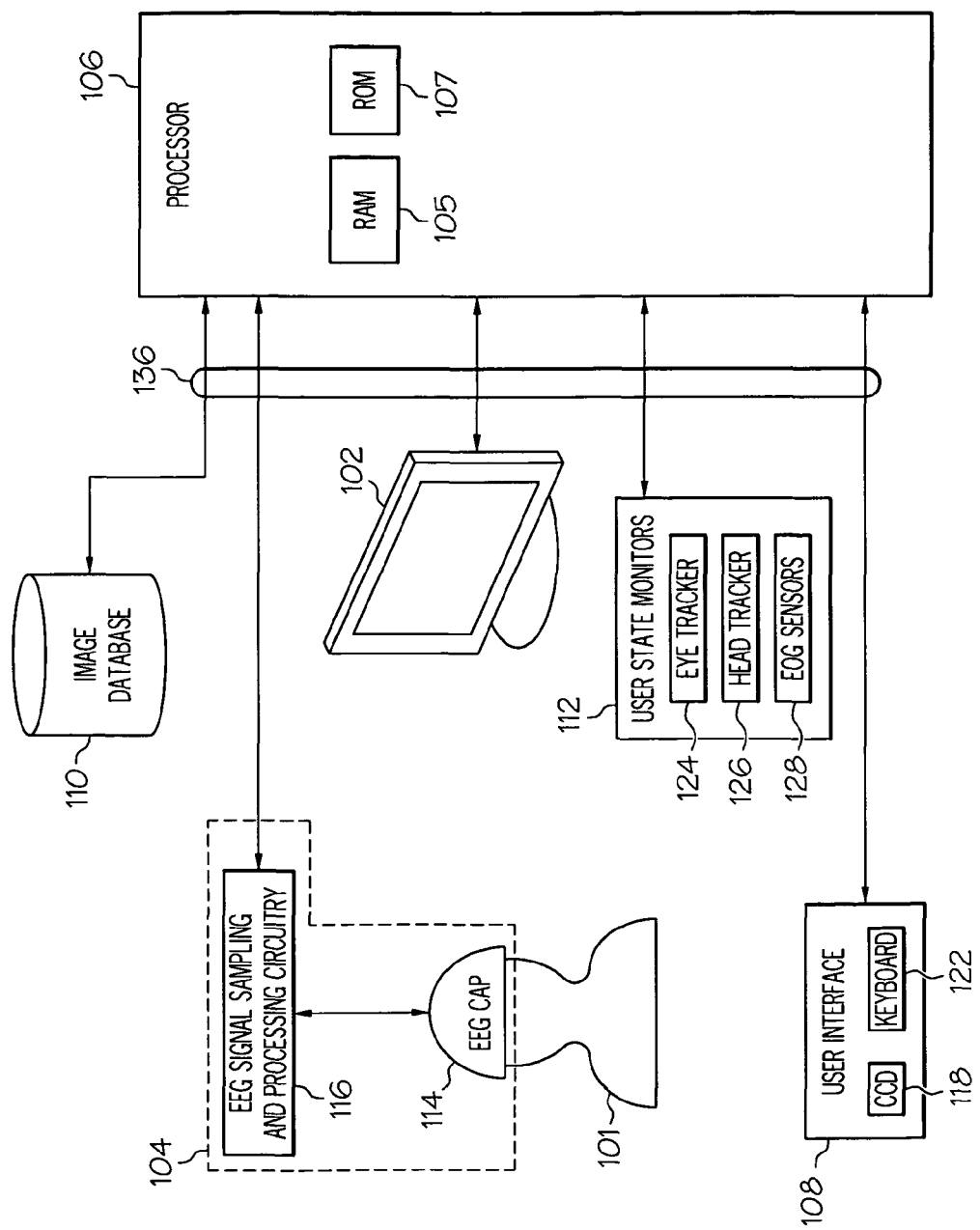
FIG. 1 depicts a functional block diagram of an exemplary image triaging system.

Turning first to FIG. 1, a functional block diagram of an exemplary system 100 that may be used to triage images is depicted. The depicted system 100 includes a display device 102, a data collector 104, and a processor 106. As FIG. 1 further depicts, in some embodiments the system 100 may additionally include a user interface 108, an image database 110, and one or more user state monitors 112. The display device 102 is in operable communication with the processor 106 and, in response to display commands received therefrom, displays one or more images to a user 101. It will be appreciated that the display device 102 may be any one of numerous known displays suitable for rendering graphic, icon, and/or textual images in a format viewable by the user 101. Non-limiting examples of such displays include various cathode ray tube (CRT) displays, and various flat panel displays such as, for example, various types of LCD (liquid crystal display) and TFT (thin film transistor) displays. The display may additionally be based on a panel mounted display, a head up display (HUD) projection, or any known technology.

The data collector 104 in the depicted embodiment is a neurophysiological data collector that is configured to be disposed on, or otherwise coupled to, the user 101, and is operable to selectively collect neurophysiological data from the user 101. Preferably, and as depicted in FIG. 1, the neurological data collector 104 is implemented as an electroencephalogram (EEG) system, and most preferably as a multi-channel EEG cap 114, and appropriate EEG signal sampling and processing circuitry 116. It will be appreciated that the number of EEG channels may vary. Moreover, the EEG signal sampling and processing circuitry 116 may be implemented using any one of numerous known suitable circuits and devices including, for example, one or more analog-to-digital converters (ADC), one or more amplifiers, and one or more filters. No matter the particular number of EEG channels and the particular type of EEG signal sampling and processing circuitry 116 that is used, it is in operable communication with, and is configured to supply the collected EEG data to, the processor 106. As will be described in more detail further below, the EEG signal sampling and processing circuitry 116 is further configured to receive trigger signals from the processor 106, and to record the receipt of these trigger signals concurrently with the EEG signals.

The user interface 108 is in operable communication with the processor 106 and is configured to receive input from the user 101 and, in response to the user input, supply various signals to the processor 106. The user interface 108 may be any one, or combination, of various known user interface devices including, but not limited to, a cursor control device (CCD), such as a mouse, a trackball, or joystick, and/or a keyboard, one or more buttons, switches, or knobs. In the depicted embodiment, the user interface 108 includes a CCD 118 and a keyboard 122. The user 101 may use the CCD 118 to, among other things, move a cursor symbol on the display device 102, and may use the keyboard 122 to, among other things, input various data. As will be described further below, the user 101 may additionally use either the CCD 118 or keyboard 122 to selectively supply physical response data, the purpose of which are also described further below.

The one or more user state monitors 112, if included, are operable to selectively collect various data associated with the user 101. The one or more user state monitors 112 may include at least an eye tracker 124, a head tracker 126, and one or more EOG (electrooculogram) sensors 128. The eye tracker 124, if included, is configured to detect the movement of one or both of the user's pupils. The head tracker 126, if included, is configured to detect the movement and/or orientation of the user's head. The EOG sensors 128, if included, are used to detect eye blinks and various eye movements of the user 101. Although any one of numerous devices may be used to implement the eye tracker 124 and head tracker 126, in the depicted embodiment one or more appropriately mounted and located video devices, in conjunction with appropriate processing software components are used to implement these functions. Though not explicitly depicted in FIG. 1, appropriate signal sampling and processing circuitry, if needed or desired, may be coupled between the eye tracker 124 and/or the head tracker 126 and the processor 106. Moreover, the same or similar signal sampling and processing circuitry 116 that is used with the EEG cap 114 may additionally be used to supply appropriate EOG signals to the processor 106. It will be appreciated that, at least in some embodiments, the system 100 may be implemented without one or all of the user state monitors 112. No matter which, if any, of the user state monitors 112 that are included in the system 100, each supplies appropriate user state data to the processor 106.

The processor 106 is in operable communication with the display device 102, the neurophysiological data collector 104, the user interface 108, and the image database 110 via, for example, one or more communication buses or cables 136. The processor 106 is coupled to receive neurophysiological data from the neurophysiological data collector 104. As noted above, the processor 106 may additionally receive physical response data from the user interface 108. As will be described in more detail further below, the processor 106, based at least in part on one or more of these data, assigns probabilities to discrete sections of an image. The assigned probabilities are representative of the likelihood that the discrete sections of the image include a target entity.

It was additionally noted above that the processor 106, at least in some embodiments, may also receive user state data from the one or more user state monitors 112. In such embodiments, the processor 106 appropriately processes the user data and the neurophysiological data to determine whether one or more of these data, either alone or in combination, indicate the user 101 is in a state that could adversely compromise the effectiveness of the image triage processing, which is described in more detail further below. It is noted that, based on this determination, the processor 106 may generate one or more user alerts and/or vary the pace of one or more portions of the below-described image triage processing.

The processor 106 may include one or more microprocessors, each of which may be any one of numerous known general-purpose microprocessors or application specific processors that operate in response to program instructions. In the depicted embodiment, the processor 106 includes on-board RAM (random access memory) 105, and on-board ROM (read only memory) 107. The program instructions that control the processor 106 may be stored in either or both the RAM 105 and the ROM 107. For example, the operating system software may be stored in the ROM 107, whereas various operating mode software routines and various operational parameters may be stored in the RAM 105. It will be appreciated that this is merely exemplary of one scheme for storing operating system software and software routines, and that various other storage schemes may be implemented. It will also be appreciated that the processor 106 may be implemented using various other circuits, not just one or more programmable processors. For example, digital logic circuits and analog signal processing circuits could also be used.

The image database 110 preferably has various types of imagery collections stored therein. The imagery collection types may vary, and may include, for example, various types of static imagery and various types of video imagery. It will additionally be appreciated that, although the image database 110 is, for clarity and convenience, shown as being stored separate from the processor 106, all or portions of this database 110 could be loaded into the on-board RAM 105, or integrally formed as part of the processor 106, and/or RAM 105, and/or ROM 107. The image database 110, or the image data forming portions thereof, could also be part of one or more non-illustrated devices or systems that are physically separate from the depicted system 100.

Figure 2:
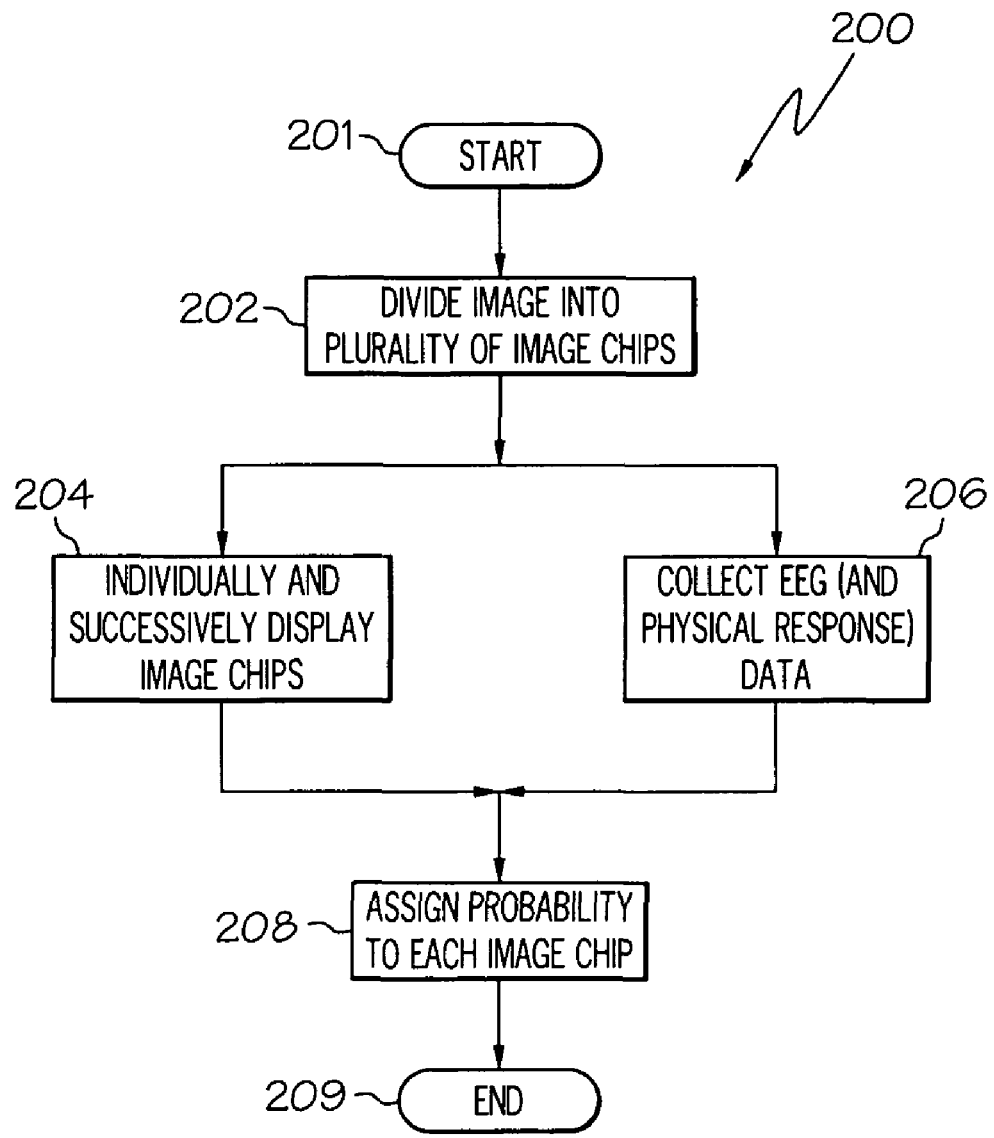
FIG. 2 depicts an exemplary process, in flowchart form, that may be implemented by the image triaging system of FIG. 1.

As was previously noted, the processor 106 receives neurophysiological data, physical response data, or both, and may additionally receive user state data. The processor 106, based at least in part on one or more of these data, assigns probabilities to discrete sections of an image. These assigned probabilities are representative of the likelihood that these discrete sections of the image include a target entity. The overall process 200 by which the processor 106 implements these outcomes is depicted in flowchart form in FIG. 2, and with reference thereto will now be described in more detail. Before doing so, however, it is noted that the depicted process 200 is merely exemplary of any one of numerous ways of depicting and implementing the overall process to be described. Moreover, before the process 200 is initiated, it is noted that, if neurophysiological data are collected, at least the neurophysiological data collector 104 has preferably been properly applied to the user 101, and appropriately configured to collect neurophysiological data. If included, the one or more user monitors 112 have also preferably been applied to the user 101, and appropriately configured to collect user state data. With this background in mind, it is additionally noted that the numerical parenthetical references in the following description refer to like steps in the flowchart depicted in FIG. 2.

Turning now to the description of the process 200, it is seen that when an image is retrieved from the image database 110, the processor 106, and most notably the appropriate software being implemented by the processor 106, divides the retrieved image into a plurality of smaller discrete sub-images, or chips (202). These chips, which are referred to herein as triage image chips, are individually and successively displayed on the display device 102 to the user 101 (204). Preferably, the triage image chips are presented using a rapid serial visualization presentation (RSVP) technique. Thus, each triage image chip is individually displayed, preferably at the same location on the display device 102, for a presentation time period, preferably in a predetermined sequence, and preferably at substantially equivalent luminance levels. Though one or more of these parameters may be varied manually or automatically.

While the triage image chips are being displayed to the user 101, data such as, neurophysiological data, physical response data, or both, are collected from the user 101 (206). As was noted above, in some embodiments, user state data may additionally be collected via the user interface 108 and the one or more state monitors 112, respectively. As was also previously noted, if neurophysiological data are collected, these data are preferably EEG data collected via the multi-channel EEG cap 114. It will be appreciated that, if collected, either the CCD 118 or the keyboard 122 may be used to collect the physical response data. In particular, the user 101 will hit either a predetermined button on the CCD 118 or a predetermined key on the keyboard 122 each time the user 101 believes a displayed triage image chip includes a target entity, or at least a portion of a target entity.

After the neurophysiological data are collected and, in some embodiments, the physical response data and/or the user state data are collected, a probability is assigned to each triage image chip (208). The probability that is assigned to each triage image chip is based on these collected data, either alone or in combination, and is representative of the likelihood that the triage image chip includes a target entity.

Figure 3:
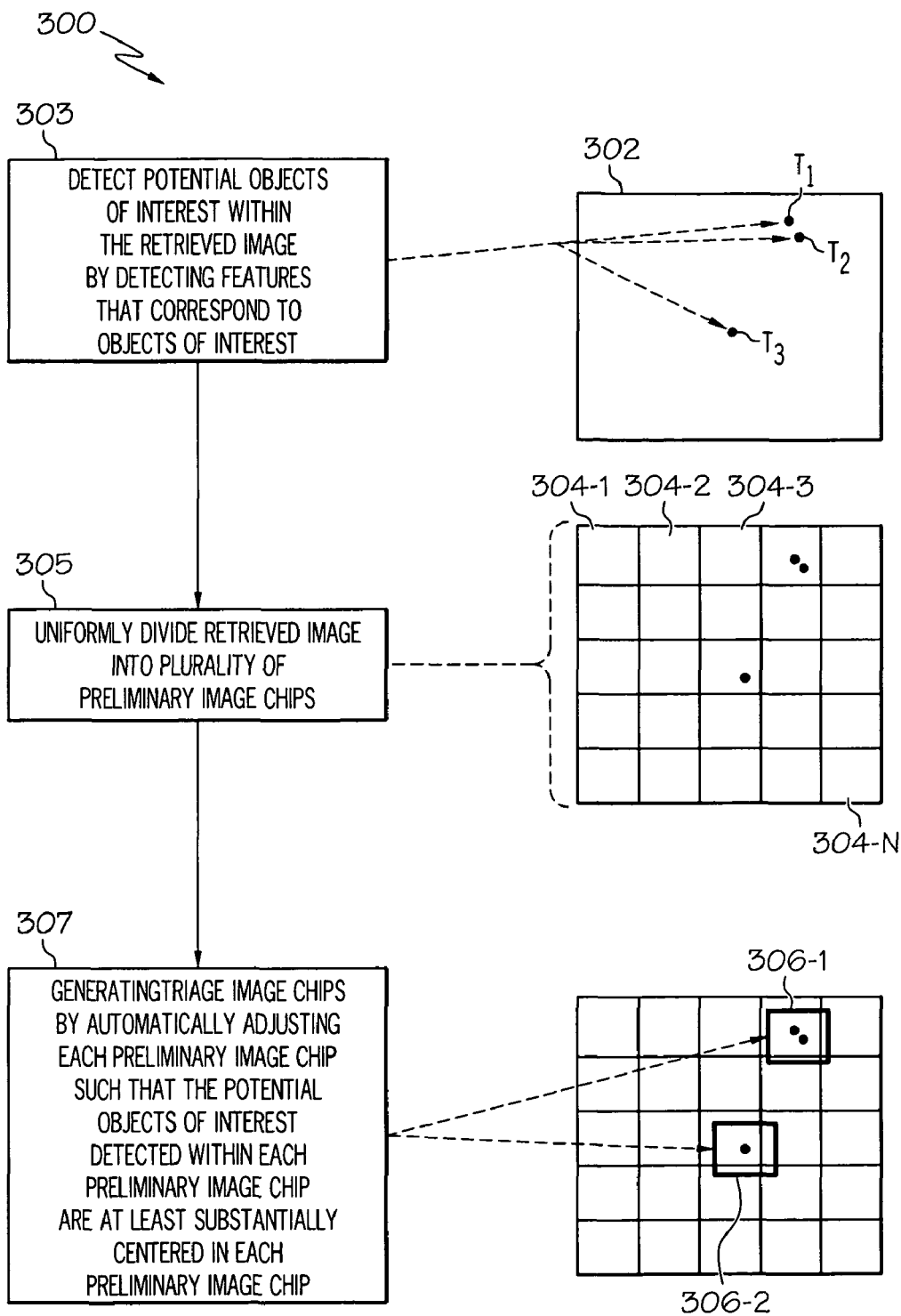
FIG. 3 depicts a process flow diagram of a general preprocessing method implemented by the system of FIG. 1 that results in potential objects of interest being at least substantially centered in the discrete sub-image.

The image triage chips that are individually and successively displayed on the display device 102 are discrete sub-images of a larger broad area image that have been preprocessed. The preprocessing that is conducted results in potential objects of interest (e.g., potential target entities) being at least substantially centered in the discrete sub-image. A process flow diagram of the method 300 that the system 100 implements to achieve this result is depicted in FIG. 3, and with reference thereto will now be described.

The method 300 begins upon retrieval of the larger, broad area image 302 from, for example, the image database 110. When the image 302 is retrieved, the processor 106, implementing suitable methodologies, detects potential objects of interest within the image (303). In the depicted embodiment, the image 302 includes three objects of interest that, for simplicity of illustration, are labeled T1, T2, and T3 on FIG. 3. It will be appreciated that in an actual physical implementation, the image 302 may include any number of objects of interest, which may be, for example, various types of land vehicles, seagoing vessels, special use land masses, weapons sites, or military bases, just to name a few examples.

No matter the particular number or type (or types) of objects of interest, the image processing methods implemented in the processor 106 to detect potential objects of interest may vary. The image processing methods may include one or more of image entropy segmentation, local histogram equalization, image gradients, directional edge magnitudes, edge orientation, spatial filter responses, local binary patterns, and localized median filters, just to name a few.

Figure 4:
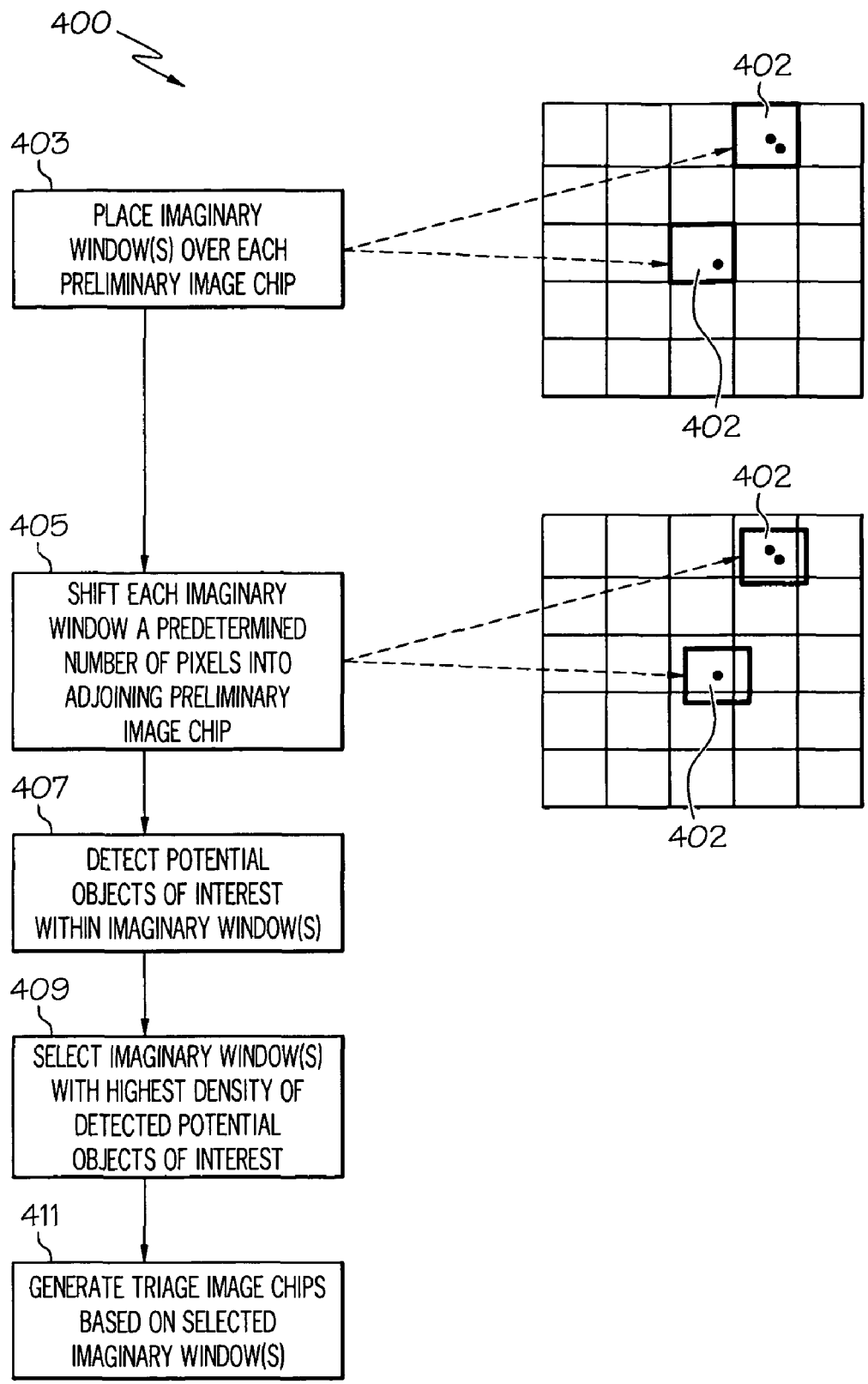
FIG. 4 depicts a process flow diagram of an exemplary method of generating triage image chips.

After potential objects of interest are detected within the retrieved image 302, the retrieved image is uniformly divided into a plurality of what are referred to herein as preliminary image chips 304 (e.g., 304-1, 304-2, 304-3, ... 304-N) (305). Thereafter, the triage image chips 306 (e.g., 306-1, 306-2, 306-3, ... 306-N) are generated by automatically adjusting each preliminary image chip 304 such that the detected objects of interest within each preliminary image chip 304 are at least substantially centered in each preliminary image chip 304 (307). It will be appreciated that the manner in which the triage image chips 306 are generated may vary. A process flow diagram of a particular preferred method 400 of generating the triage image chips 306 for display is depicted in FIG. 4, and will now be described.

In the depicted methodology 400, after the retrieved image 302 has been uniformly divided into the plurality of preliminary image chips 304, an imaginary window 402 is placed over each preliminary image chip 304 (403). The imaginary windows 402 are then shifted, in each direction, a maximum predetermined number of pixels into adjoining preliminary image chips 304 (405). That is, in the context of FIG. 4, each imaginary window 402 is shifted in both the horizontal direction (e.g., the +x-directions) and vertical direction (e.g., the +y-directions) independently and jointly by all values up to the maximum predetermined number of pixels. Although only two imaginary windows 402 are depicted in FIG. 4 as being shifted, it should be appreciated that this is done merely for clarity and ease of illustration. Indeed, in actual embodiments, each imaginary window 402 is preferably shifted the predetermined number of pixels.

It will additionally be appreciated that a single imaginary window 402 may be associated with each preliminary image chip 304, or two or more imaginary windows 402 may be associated with each preliminary image chip 304. If a single imaginary window 402 is associated with each preliminary image chip 304, then the single imaginary window 402 is shifted four times. That is, it is shifted the predetermined number of pixels in the +x-direction, the −x-direction, the +y-direction, and the −y-direction. If two imaginary windows 402 are associated with each preliminary image chip 304, then one imaginary window may be shifted in the +x-direction, while the other imaginary window may be shifted in the +y-direction. In a particular preferred embodiment, four imaginary windows are associated with each preliminary image chip 304, with one shifted in the +x-direction, a second shifted in the −x-direction, a third shifted in the +y-direction, and the fourth shifted in the −y-direction.

When the imaginary windows 402 are shifted the predetermined number of pixels, potential objects of interest within the imaginary windows 402 are detected (407). The imaginary window 402 associated with each preliminary image chip 304 that had the highest density of detected potential objects of interest is selected (409), and the triage image chips 306 are generated based on these selections (411). Each triage image chip 306 is generated by calculating the centroid of all of the potential objects of interest detected within the selected imaginary window 402, and creating a new chip region with the calculated centroid in the middle of the selected imaginary window 402.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A method of dividing an image into a plurality of image chips for presentation on a display, the method comprising the steps of:
   detecting potential objects of interest within the image by detecting features therein that correspond to objects of interest;
   uniformly dividing the image into a plurality of preliminary image chips; and
   generating triage image chips by automatically adjusting each preliminary image chip such that the potential objects of interest detected within each preliminary image chip are at least substantially centered in each triage image chip,
   wherein the step of generating the triage image chips comprises:
      placing one or more associated imaginary windows over each preliminary image chip;
      for each preliminary image chip, shifting its one or more associated imaginary windows a maximum predetermined number of pixels into an adjoining preliminary image chip;
      after shifting the imaginary windows the maximum predetermined number of pixels, detecting potential objects of interest within each imaginary window; and
      selecting the imaginary windows having a highest number of detected potential objects of interest therein.

2. The method of claim 1, wherein the step of generating the triage image chips further comprises:
   calculating a centroid of all of the potential objects of interest within the selected imaginary windows; and
   generating new chip regions with the calculated centroids in the middle of the selected imaginary windows, each new chip region corresponding to an triage image chip.

3. The method of claim 1, further comprising:
   displaying each triage image chip to a user on a display device.

4. The method of claim 3, wherein the step of displaying each triage image comprises:
   successively displaying each triage image chip to the user on the display device for a predetermined presentation time period.

5. The method of claim 4, further comprising:
   collecting data from the user at least while each triage image chip is being displayed to the user; and
   for each triage image chip that is displayed, assigning a probability that the image chip at least includes an object of interest, based at least in part on the collected data.

6. The method of claim 5, wherein the triage image chips are successively displayed to the user in accordance with a rapid serial visualization (RSVP) paradigm.

7. The method of claim 5, wherein the collected data are neurophysiological data.

8. The method of claim 5, wherein the collected data are physical response data.

9. The method of claim 5, wherein the collected data are neurophysiological data and physical response data, and wherein the method further comprises:
   for each triage image chip, assigning the probability that the triage image chip at least includes a target entity, based on the collected neurophysiological data and the collected physical response data.

10. A system for conducting image triage of an image that may include one or more objects of interest, comprising:
    a display device operable to receive display commands and, in response thereto, to display an image; and
    a processor coupled to the display device and configured to:
       selectively retrieve an image,
       detect potential objects of interest within the image by detecting features therein that correspond to objects of interest,
       uniformly divide the image into a plurality of preliminary image chips,
       place one or more associated imaginary windows over each preliminary image chip,
       for each preliminary image chip, shift its one or more associated imaginary windows a maximum predetermined number of pixels into an adjoining preliminary image chip,
       after shifting the imaginary windows the maximum predetermined number of pixels, detect potential objects of interest within each imaginary window, and
       select the imaginary windows having a highest number of detected potential objects of interest therein, to thereby generate triage image chips such that the potential objects of interest detected within each preliminary image chip are at least substantially centered in each triage image chip.

11. The system of claim 10, wherein the processor is further configured to:
    calculate a centroid of all of the potential objects of interest within the selected imaginary windows; and generate new chip regions with the calculated centroids in the middle of the selected imaginary windows, each new chip region corresponding to an triage image chip.

12. The system of claim 10, wherein the processor is further configured to:
command the display device to successively display each triage image chip.

13. The system of claim 12, wherein the processor is further configured to:
command the display device to successively display each triage image chip for a predetermined presentation time period.

14. The system of claim 13, further comprising:
a data collector in operable communication with the processor and configured to at least selectively collect data from a user,
wherein the processor is further configured to assign a probability to each displayed triage image chip based at least in part on the collected data, each assigned probability representative of a likelihood that the triage image chip at least includes a potential object of interest.

15. The system of claim 14, wherein the processor is further configured to command the display device to successively display the triage image chips in accordance with a rapid serial visualization (RSVP) paradigm.

16. The system of claim 14, wherein the data collector comprises a neurophysiological data collector configured to at least selectively collect neurophysiological data from the user.

17. The system of claim 14, wherein the data collector comprises a user interface configured to receive input stimulus from the user and, in response thereto, to supply physical response data.

18. The system of claim 14, wherein:
the data collector comprises a neurophysiological data collector configured to at least selectively collect neurophysiological data from the user and a user interface configured to receive input stimulus from the user and, in response thereto, to supply physical response data; and
the processor is configured to assign the probability based on the collected neurophysiological data and the collected physical response data.

* * * * *